United States Patent [19]
Kalmanson

[11] 3,955,832
[45] May 11, 1976

[54] AIRCRAFT TOW BAR DEVICE

[76] Inventor: Samuel Kalmanson, 8320 SW. 23 St., Miami, Fla. 33155

[22] Filed: June 19, 1975

[21] Appl. No.: 588,210

[52] U.S. Cl. .............................. 280/476 R; 403/119; 403/322
[51] Int. Cl.² ......................................... B60D 1/14
[58] Field of Search ........ 280/423 A, 476 R, 456 R, 280/405 A, 495, 498; 180/14 C; 214/331, 322, 333, 334; 403/92, 119, 322, 324, 317, 316, 379

[56] References Cited
UNITED STATES PATENTS

| | | | |
|---|---|---|---|
| 2,773,703 | 12/1956 | Ferguson | 280/476 R |
| 2,846,018 | 8/1958 | Puckett | 180/14 C |
| 2,919,043 | 12/1959 | Sharp | 180/14 C |
| 3,146,000 | 8/1964 | Holzman | 280/405 A X |
| 3,709,522 | 1/1973 | Olson | 180/14 C X |
| 3,868,128 | 2/1975 | Mahieu | 180/14 C X |

*Primary Examiner*—M. H. Wood, Jr.
*Assistant Examiner*—R. Schrecengost

[57] ABSTRACT

A tow bar device including an elongated tow bar stem having a latch means, fixed relative to a first end thereof for attachment to a tow vehicle, and a second head end providing a pair of oppositely operable slide fingers carrying oppositely extending latch pins for selective engagement or disengagement relative to a pair of holes in bracket means, conventionally fixed relative to the main strut of the nose wheel of an aircraft for towing purposes. Spring biased means is provided to automatically lock the pins in position when they are engaged through the bracket holes. Wheel means is provided intermediate the length of the tow bar assembly with a rocking saddle means interconnecting the wheel means and tow bar stem to permit the tow bar and head to be rocked or pivoted to a desired position to align the latch pins with the strut bracket holes when the nose wheel assembly is sidewardly inclined in either direction.

13 Claims, 12 Drawing Figures

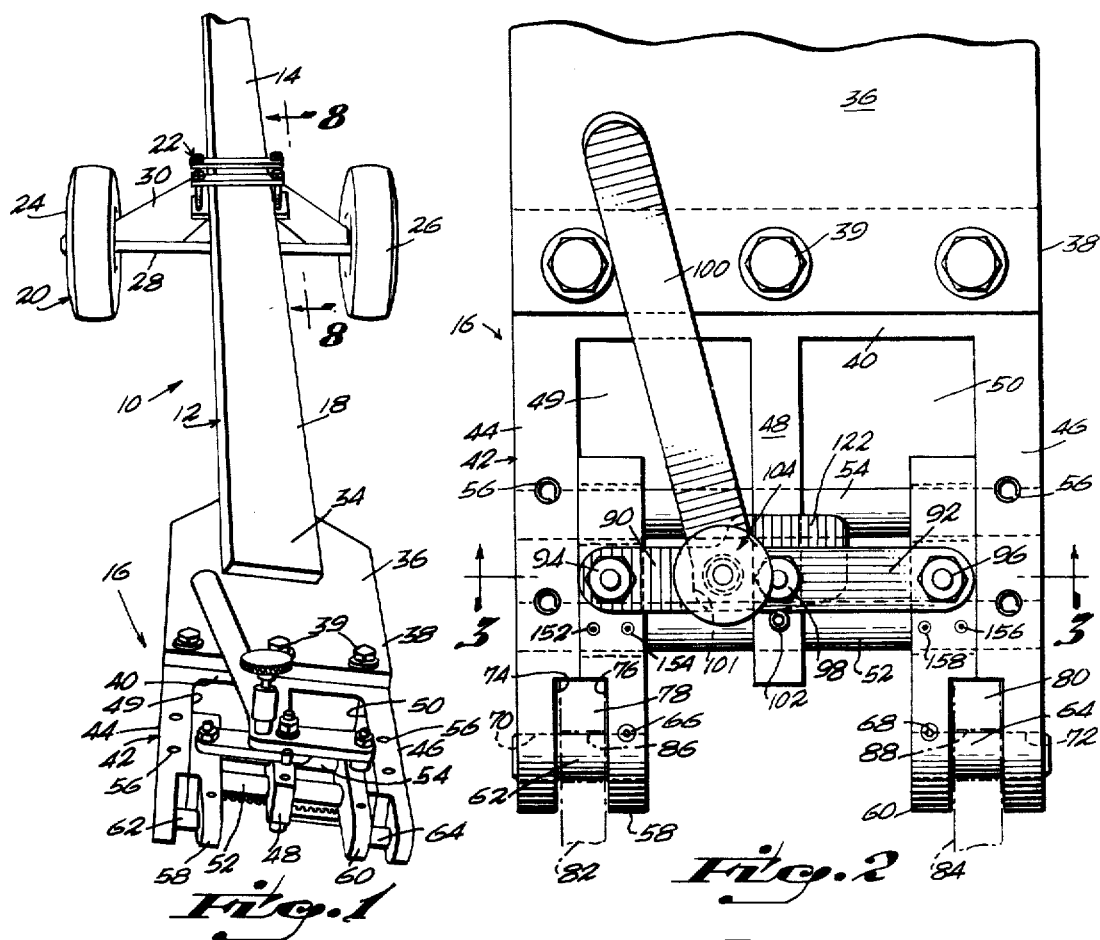

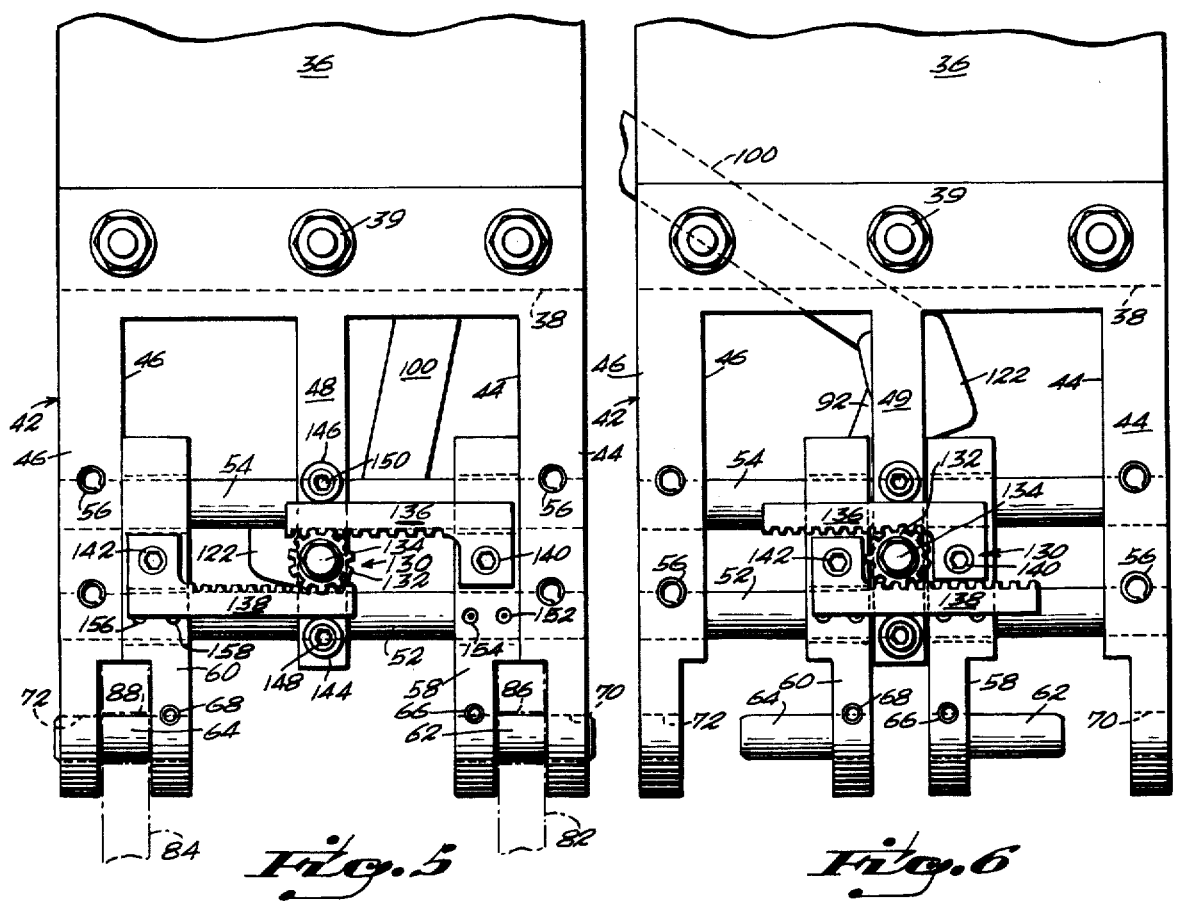
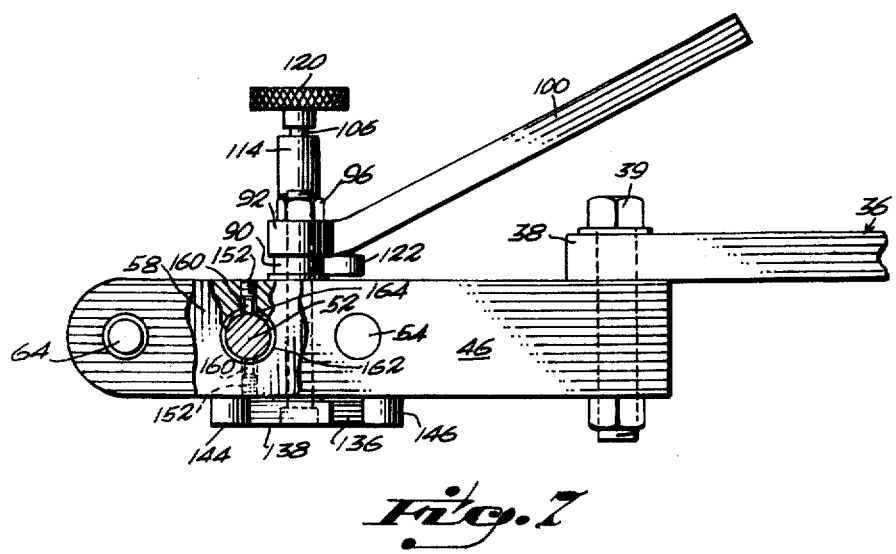

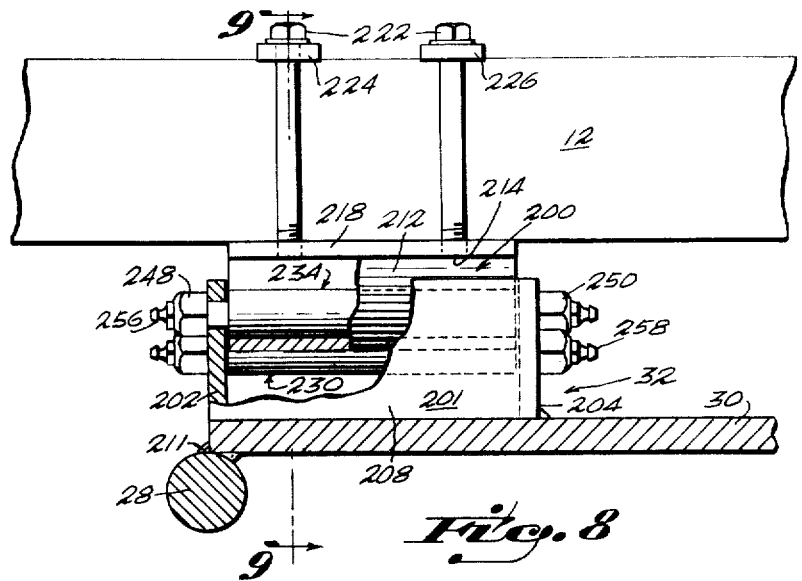
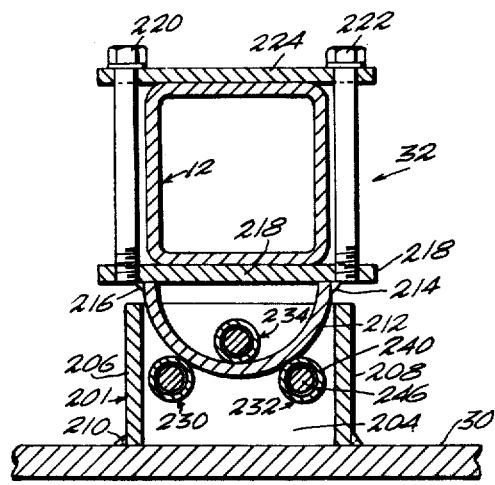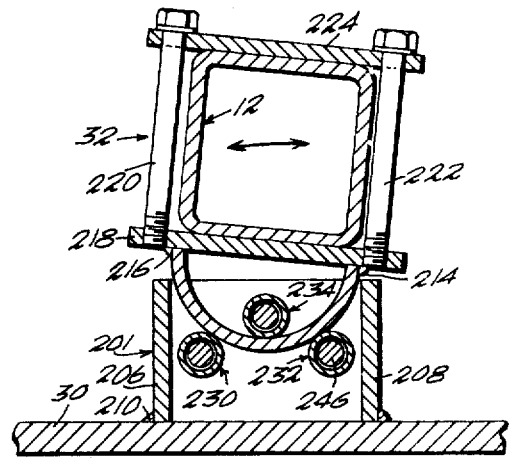
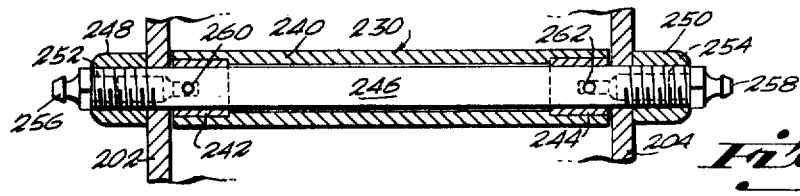
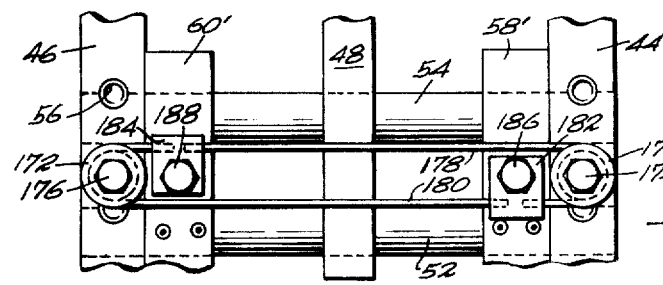

3,955,832

1

AIRCRAFT TOW BAR DEVICE

FIELD OF THE INVENTION

The present invention pertains to tow bar devices commonly used to tow various type of aircraft having nose wheel assemblies, and which is adapted to engage and lock relative to a bracket fixed to the main strut of the nose wheel assembly. Means are provided to permit the entire tow bar assembly to be transversely rocket for aligning purposes.

OBJECTS AND ADVANTAGES OF THE PRESENT INVENTION

One of the principal objects of the present invention is to provide a tow bar device which attaches to a tow vehicle at a first end and includes a head assembly fixed to a second end, including means to engage and lock relative to a bracket carried by the main strut of the nose wheel assembly of an aircraft such as a jet airplane.

Another principal object of this invention is to provide means to permit a transverse rocking motion to be imparted to the tow bar assembly, including the head, to align the respective locking means associated with the head and the nose wheel strut bracket holes.

A further object of the invention is to provide lever and link means privotally connected to a pair of forwardly extending fingers to selectively move said fingers in opposed directions along transverse slide rod means carried by the main frame of the head.

Yet another object of the instant invention is to provide oppositely, transversely projecting lock pins from the front end portions of the respective fingers for engagement through appropriate holes provided in the bracket fixed relative to the main strut of the nose wheel assembly of an aircraft.

A still further object of the present invention is to provide spring biased lock means to automatically lock the lever, link means and fingers relative to each other when the lock pins are engaged through the bracket holes.

Yet another object of this invention is to provide means to synchronize the movement of the links and pin carrying fingers.

Another object of the present invention is to provide means, intermediate the carriage wheels of the tow bar assembly and the main stem thereof, to permit a transverse rocking movement to be imparted thereto to align the lock pins with the holes in the nose wheel bracket when the strut and nose wheel assembly is tilted to either side.

BRIEF DESCRIPTION OF THE DRAWINGS

FIG. 1 is a perspective view of a tow bar device incorporating the present invention;

FIG. 2 is a top plan view of the head end of the device with the lock pins in a locked position relative to the bracket holes;

FIG. 3 is a cross sectional view taken along line 3—3 of FIG. 2, illustrating the spring biased locking means;

FIG. 4 is a top plan view similar to FIG. 2 with the lock pins moved to unlocked or open positions;

FIG. 5 is a bottom plan view of the head end of the tow bar illustrating a first form of lever synchronizing means with the lock pins in a locked position as in FIG. 2;

2

FIG. 6 is a view similar to FIG. 5 with the lock pins in an unlocked position as in FIG. 4;

FIG. 7 is a side elevational view of the tow bar head portion;

FIG. 8 is a longitudinal sectional view taken along line 8—8 of FIG. 1 illustrating a side view of the rocking saddle arrangement with parts broken away for illustration purposes;

FIG. 9 is a cross sectional view taken along line 9—9 of FIG. 8;

FIG. 10 is a cross sectional view similar to FIG. 10 illustrating the rocking movement of the tow bar assembly as provided by the rocking saddle;

FIg. 11 is a fragmentary longitudinal sectional view taken through one of the bearing rollers of FIGS. 8, 9 and 10; and FIG. 12 is a fragmentary bottom plan view of the tow bar head illustrating a second form of lever synchronizing means.

DETAILED DESCRIPTION OF THE DRAWINGS

With reference to the drawings in which like reference characters designate like or corresponding parts throughout the various views and with particular reference to FIG. 1, a tow bar assembly incorporating the present invention is shown generally at 10 and includes a main stem 12 providing a rear end portion 14 equipped with any convenient, conventional type of hitch (not shown) for attachment to a tow vehicle. A tow head portion 16 is fixed relative to the distal end of a forward end portion 18 of the tow bar stem 12.

Intermediate the length of the stem, a wheel assembly 20 is fixed as at 22. The wheel assembly is comprised generally of an opposed pair of side wheels 24 and 26, rotatably mounted to an axle 28, fixed as by welding to a cross plate member 30. As will be subsequently described in detail, a rocking saddle assembly, indicated generally at 32 in FIGS. 8, 9 and 10, interconnects between the plate 30 and the tow bar stem 12 to permit a transverse rocking movement to be imparted to the tow bar stem 12 and head 16.

With reference to the head assembly as illustrated in FIGS. 1 through 7, the distal end 34 of the second stem portion 18 is fixed as by welding to the back end of plate 36. The forward end 38 of plate 36 is bolted at 39 to a transverse base web 40 of a generally E-shaped main head frame 42 including opposed outer arms 44 and 46 and a central arm 48, bisecting the distance between the arms 44 and 46 to define a double yoke 49 and 50. A pair of transverse, spaced apart rods 52 and 54, spanning the yokes 49 and 50 and extending through the arms 44, 46 and 48 are fixed by pin means 56 relative to the outer arms 44 and 46. A pair of forwardly extending, opposed fingers 58 and 60 are slidably engaged on the rods 52 and 54 within the respective yokes 49 and 50. Oppositely, outwardly extending transverse lock pins 62 and 64 are fixed as at 66 and 68 relative to the forward end portions of fingers 58 and 60 to extend through mating holes 70 and 72 in the forward end portions of outer arms 44 and 46. The confronting, forward ends of the respective pairs of outer arms 44–46 and fingers 58–60 are cut out as at 74 and 76 to define relatively small yokes 78 and 80 for the reception of flanges 82 and 84 of a bracket (not shown), conventionally fixed to the main strut of the nose wheel of an aircraft for towing purposes. Each flange provide a through hole 86 and 88 for passage therethrough of the respective lock pins 62 and 64.

Therefore, when the fingers 58 and 60 are in the positions illustrated in FIGS. 2 and 5, the nose wheel bracket flanges are securely locked by pins 62 and 64 within yokes 78 and 80 for towing purposes. When the fingers 58 and 60 are moved to the positions illustrated in FIGS. 4 and 6, the lock pins 62 and 64 are disengaged from the flange holes 86 and 88 and are in positions for operation into engagement with the bracket holes of the next aircraft to be moved.

The opposed outer ends of a pair of links 90 and 92 are pivotally attached by nut and bolt means 94 and 96, intermediate the lengths of the respective slide fingers 58 and 60, between the rods 52 and 54. Nut and bolt means 98 pivotally connect the inner end portions of the links 90 and 92 and a lever arm 100 is angularly formed integral with or rigidly attached to an extended inner end portion 101 of link 92, beyond the central pivot 98. When the lever arm 100 of the bell crank, formed by arm 100 and link 92, is manually rotated clockwisely to the position of FIG. 4, the links 90 and 92 are moved in scissors fashion to slide the fingers 58 and 60 inwardly along rods 52 and 54, in opposed directions, against the central arm 48 to move the lock pins 62 and 64 to the open positions of FIGS. 4 and 6. A stop pin 102 in central arm 48 prevents overmovement of the links 90 and 92 when the operating arm 100 is moved counterclockwisely.

Spring biased detent means 104, as best illustrated in FIG. 3, locks the pins 62 and 64 in their engaged positions relative to the holes 86 and 88 of the nose wheel bracket flanges 82 and 84. The detent means 104 comprises a plunger pin 106 normally extending downwardly through a sleeve 108, fixed atop the extended link end 101, and a hole 110 in link 90. A compression spring 112 is encapsulated in a cap 114, screwthreaded onto the top end of sleeve 108, between the inner surface of the top 116 of cap 114 and an enlarged annular flange 118 of plunger pin 106. Thus, when the plunger pin 106 is manually withdrawn from the hole 110 in link 90, against the forces of compression spring 112, by means of a knob 120, fixed atop plunger pin 106, the operating lever 100 may be moved clockwisely as above described. While the lever 100 is being moved, the inner tip end of plunger pin 106 rides on the top surface of a widened inner extension 122 of link 90. When the lever is moved back to the position of FIG. 1, the plunger pin 106 automatically engages in the hole 110 of link 90 under the influence of compression spring 112.

With reference to FIGS. 5 and 6, the movements of the lock pin fingers 58 and 60 and links 90 and 92 are synchronized by a ratchet and gear assembly 130 carried on the bottom of the head 16. This assembly comprises a pinion gear 132 rotatably fixed by bolt 134 underneath the central arm 48, midway between the rods 52 and 54. A pair of oppositely, inwardly extending gear racks 136 and 138 are bolted at 140 and 142 to the respective fingers 58 and 60 in mesh with the pinion gear 132 in a parallel, diametrically opposed relation. Guide rollers 144 and 146, rotatably carried by bolts 148 and 150, threaded into the central arm 48, engage the respective back edges of gear racks 136 and 138.

As seen in FIGS. 2, 4, 5 and 6, two set screws such as 152, 154 and 156, 158 are provided respectively in the top and bottom of both fingers 58 and 60 in a diametric relation to the front transverse rod 52. As seen in FIG. 7, the inner end of each of these top and bottom set screws engages a nylon pin 160, the inner end of each nylon pin 160 engages the rod 52. Proper adjustment of the upper and lower pairs of set screws 152 through 158 on each finger 58 and 60 balances the movement of the fingers 58 and 60 to insure simultaneous unlocking movement thereof. Brass bushings such as 162 are provided in both fingers 58 and 60 for sliding engagement with both transverse rods 52 and 54. In the case of the front rod bearings, the nylon pins 160 pass through appropriate holes 164 therein.

FIG. 12 illustrates a modified form of synchronizing means for the movement of the lock pin fingers 58, 60 and links 90, 92, in the form of sheaves 170 and 172, rotatably bolted at 174 and 176 relative to the bottom faces of the respective outer arms 44, 46 of the main head frame 42. Cable means comprising two equal cable lengths 178 and 180 are passed around the sheaves 170 and 172, both opposed ends of the two cable lengths being clamped together by conventional clamp means 182 and 184 which are bolted at 186 and 188 relative to the bottom faces of the respective lock pin fingers 58' and 60'. When the fingers 58' and 60' are actuated by the lever actuated links 90 and 92, the sheave and cable assembly as above described synchronizes their movements in the same manner as does the pinion and gear rack assembly, previously described.

With reference to FIGS. 8 through 11, a rocking saddle means 200 is indicated which permits the main stem 12 and tow head assambly as above described to be rotated laterally to align the lock pins 62 and 64 with the holes 86 and 88 in the flanges of the main strut bracket of the nose wheel assembly of an aircraft. Quite often the supporting surface for the nose wheel of an aircraft is not level, the gasoline loading in the wings of an aircraft may not be in balance or for other reasons the main strut of the nose wheel may be inclined to one side or the other. The tolerance provided by the holes in the flanges of the nose wheel bracket is very slight and often the lock pins 62 and 64 do not align with the flange holes 86 and 88. With the conventional devices now in use, this results in a manual struggle to lift one side of the entire tow bar device to align the lock pins with the bracket flange holes to accomplish an engaged condition therebetween.

The present invention provides an open top box 201, preferably formed of steel, comprised of front and back walls 202 and 204 and opposed side walls 206 and 208, welded as at 210 to the cross plate member 30 which is in turn welded at 211 to the axle 28. An alignment saddle in the form of a half round member 212, which may, for example, be one-half of a length of appropriately sized steel pipe, is welded at 214 and 216 along its parallel edges to the bottom face of a plate 218. The plate 218 is disposed beneath the main stem 12 and is clamped thereto by pairs of opposed side bolts 220 and 222 extending through overhanging ends of a pair of spaced apart top straps 224 and 226. The lower ends of the bolts are threaded into extended ends of plate 218. Alternatively, the parallel saddle edges may be welded directly to the underside of the stem 12.

In assembly the half round saddle 212 is sized to be disposed to a predetermined extent through the open top of the box 201 and is freely journaled therein by means of three rollers, a pair of spaced apart longitudinal, side, bottom rollers 230 and 232 in engagement with the outer surface of the half round saddle 212 and a top central, longitudinal roller 234 in engagement against the inside surface of the saddle 212. Therefore, as best illustrated in FIG. 10, the main stem 12 and head 16, by means of the saddle 212 and rollers 230, 232 and 234 may be transversely rotated in either direction to a sufficient degree to accommodate any encounterable misalignment of the lock pins 62 and 64 relative to the nose wheel bracket flange holes 86 and 88.

As illustrated in FIG. 11, each roller 230, 232 and 234 may be comprised of a length of pipe 240, extending between front and back walls 202 and 204, provided with opposed end bearings 242 and 244 for rotatable engagement on a central shaft 246 which extends through the front and back walls 202 and 204; the extended ends being threaded to receive nuts 248 and 250. The opposed ends of the shaft 246 are internally drilled and threaded as at 252 and 254 to receive grease fittings 256 and 258. Diametric bores 260 and 262 at the inner ends of the bores 252 and 254 are positioned to deliver grease to the bearings 242 and 244.

What is claimed is:

1. An aircraft tow bar device including means for selective engagement with a pair of holes in opposed flanges of a bracket fixed to the main strut of the nose wheel assembly of an aircraft comprising:
   A. a main stem including,
      1. a rear end portion providing a hitch means fixed relative to its distal end for attachment to a tow vehicle, and
      2. a forward end portion;
   B. a wheel assembly fixed intermediate said rear and forward end portions;
   C. a tow head fixed relative to the distal end of said forward end portion including,
      1. a generally E-shaped main frame providing,
         a. a transverse base portion,
         b. opposed forwardly extending, parallel outer arms from said base portion,
         c. a forwardly extending central arm from said base portion, bisecting the distance between said outer arms and defining a pair of forwardly opening yokes;
      2. a pair of spaced apart, parallel, transverse rods spanning said parallel yokes and being fixed relative to said outer arms,
      3. a pair of forwardly extending parallel fingers including through holes for slidable engagement along said rods within the respective pair of yokes,
      4. a pair of oppositely, transversely extending lock pins fixed relative to the forward end portions of the respective fingers,
      5. a first means to move said fingers and associated lock pins in opposed directions from retracted positions to extended positions to engage the lock pins through the flange holes of the nose wheel bracket, or from engagement therethrough to said retracted positions,
      6. a second means to lock said lock pins in engagement through said bracket flange holes,
      7. a third means to synchronize the movement of said pair of fingers and associated lock pins from said retracted positions to said extended positions and from the extended positions to said retracted positions.

2. An aircraft tow bar device as defined in claim 1 including a transverse pivot means fixed between said main stem and said wheel assembly to permit manually imparted transverse rotational movement to said main stem and tow head.

3. An aircraft tow bar device as defined in claim 2 wherein said transverse pivot means comprises an open top, generally rectangular box fixed longitudinally, as by welding, atop a cross plate comprising a part of said wheel assembly, and a half round saddle having its upper, parallel edge portions fixed longitudinally relative to the underside of said main stem with the half round portion thereof being sized to freely extend a predetermined distance downwardly into said box through said open top, and journal means fixed longitudinally of said box in engagement with said saddle to maintain the saddle in said box and to permit a predetermined degree of transverse rotational movement thereof within said box.

4. An aircraft tow bar device as defined in claim 3 wherein said journal means comprises a pair of spaced apart bottom rollers in engagement with the outer surface of the half round saddle and a top central roller in engagement against the inside surface of the half round saddle.

5. An aircraft tow bar device as defined in claim 4 wherein each of said rollers is journaled on a longitudinal shaft, fixed by nut means relative to front and back walls of said box.

6. An aircraft tow bar device as defined in claim 5 including brass bearings fixed relative to the opposed ends of each of said rollers in engagement with said longitudinal shaft and grease fittings extending into the opposed ends of each of said longitudinal shaft in communication with the respective brass bearings.

7. An aircraft tow bar device as defined in claim 3 wherein said longitudinal edge portions of said saddle are fixed as by welding to the underside of a generally rectangular plate and including clamp means to adjustably fix said plate relative to the underside of said main stem.

8. An aircraft tow bar device as defined in claim 1 wherein said first means comprises a pair of oppositely extending links, pivotally attached at their outer ends intermediate the lengths of the respective fingers and being pivotally attached together at their confronting inner end portions, and including lever means extending angularly upwardly and rearwardly from an extended inner end portion of one of said links for manual pivotal actuation of said links to selectively slide said lock pin carrying fingers inwardly and outwardly in opposed directions along said transverse rods.

9. An aircraft tow bar device as defined in claim 8 wherein said second means comprises a spring biased detent means, fixed relative to an extended inner end of a first of said pair of links and a hole in an extended inner end portion of the second of said pair of links to automatically receive said detent means in locked engagement therein when said fingers are moved to their outermost extended positions, and including knob means fixed relative to said detent means for manual movement thereof out of engagement with said second link hole to permit actuation of said fingers to said retracted positions.

10. An aircraft tow bar device as defined in claim 8 wherein said third means includes a pair of oppositely, inwardly extending gear racks fixed at their outer ends relative to the bottom faces of the respective fingers in common mesh with a pinion gear rotatably fixed relative to the bottom face of said central arm, and a pair of guide rollers rotatably carried on said central arm in contact with the back edges of the respective gear racks.

11. An aircraft tow bar device as defined in claim 10 wherein said third means includes a plurality of set screws, carried by the respective fingers in a diametrically spaced relation to one of said transverse rods, and a nylon pin intermediate the surface of said one rod and the inner end of each of said set screws.

12. An aircraft tow bar device as defined in claim 1 wherein said third means comprises a pair of sheaves rotatably fixed relative to the bottom faces of the respective outer arms of said main frame, cable means comprising two equal cable lengths passed around said pair of sheaves, and two clamp means connecting the respective opposed ends of said two cable lengths, said two clamp means being fixed relative to the bottom faces of the respective fingers.

13. An aircraft tow bar device as defined in claim 11 including brass bushings fixed relative to each of said finger through holes for sliding engagement along said pair of transverse rods.

* * * * *